Figure 1:
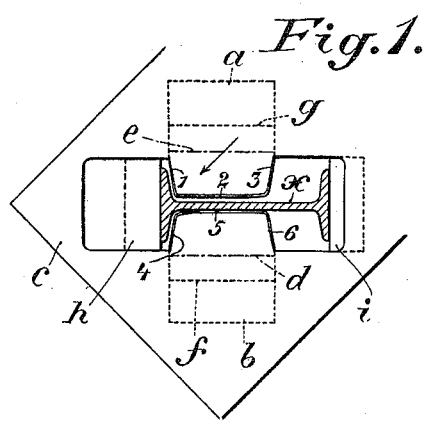

H. JOHN.
GIRDER CUTTING DEVICE.
APPLICATION FILED FEB. 25, 1910.

995,252.

Patented June 13, 1911.

2 SHEETS—SHEET 1.

Witnesses:

Inventor
Hugo John
By
James L. Norris
Atty

H. JOHN.
GIRDER CUTTING DEVICE.
APPLICATION FILED FEB. 25, 1910.

995,252.

Patented June 13, 1911.

2 SHEETS—SHEET 2.

Witnesses

Inventor
Hugo John
By
James L. Norris
Atty.

UNITED STATES PATENT OFFICE.

HUGO JOHN, OF ILVERSGEHOFEN, NEAR ERFURT, GERMANY.

GIRDER-CUTTING DEVICE.

995,252. Specification of Letters Patent. Patented June 13, 1911.

Application filed February 25, 1910. Serial No. 545,943.

*To all whom it may concern:*

Be it known that I, HUGO JOHN, manufacturer, a subject of the King of Prussia, German Emperor, residing at Ilversgehofen, near Erfurt, Kingdom of Prussia, Germany, have invented certain new and useful Improvements in or Relating to Girder-Cutting Devices, of which the following is a specification.

My invention relates to an apparatus or device for separating double T girders of different height in one and the same cutting opening, with one and the same group of cutters, without change of cutters and without turning the double T girders in any direction or turning the device. The device cuts double T girders in a smooth section without any waste and without any deformation of the cross-section, in two operations, namely in one downward operation or cut and in one upward operation, the girder, or the device, being moved laterally for the purpose of making the second cut. By means of this device, the T girder can be easily and conveniently introduced into the cutting opening even when the end of the said girder is covered with bur due to the cutting with hot saw.

The essential features of my invention are an upper cutter and a bottom cutter mounted in a carriage vertically adjustable obliquely relatively to the web of the girder, or in two such carriages, the said cutters penetrating into the double T girder once from the top downward, and once from below upward. This double T girder is shifted between the first and the second cut in the lateral direction, either positively, or relatively to the upper cutter and to the bottom cutter. The support for the double T girder in such cutting operation is constituted of a bottom cutter and an upper cutter which are mounted in cutter holders and are stationary in the machine body, as well as by two lateral cutters which can be adjusted toward each other and away from each other, and can also be laterally shifted together. The upper and the bottom cutters mounted on the vertically adjustable carriage penetrate into the double T girder to such an extent that the web portion acted on by the cutters, is slightly displaced. The deformation of the girder web taking place during the first cutting, is again neutralized during the second cutting, and in that way the double T girder does not show any deformation at its point of separation.

A cutting operation wherein the cutters penetrate into the bar to be separated, in a manner to produce the deformation of the web, has been described for U irons in the U. S. Patent No. 919874 of the applicant, but is new for double T irons.

An embodiment of the invention is shown in the accompanying drawings, wherein—

Figure 2:
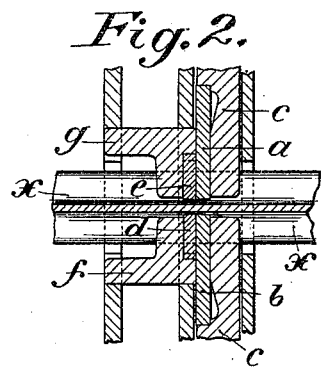
Figure 3:
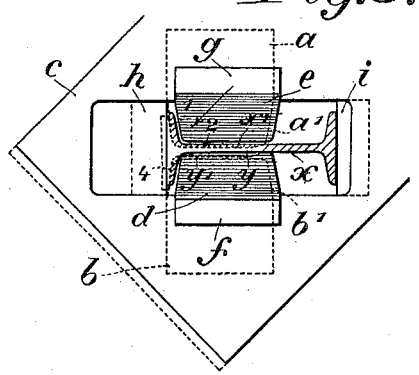
Figure 4:
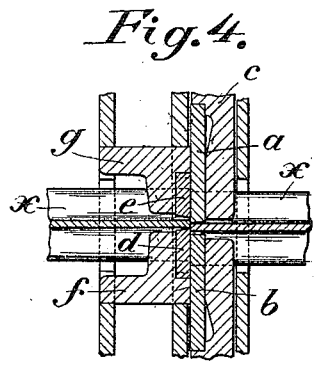
Figure 5:
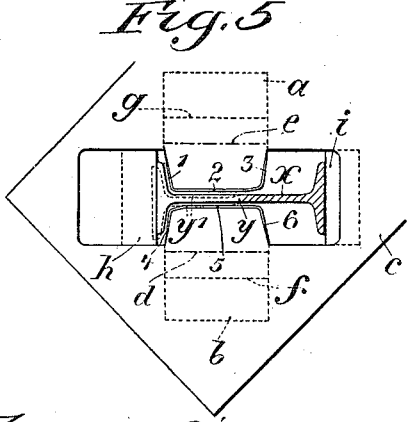
Figure 6:
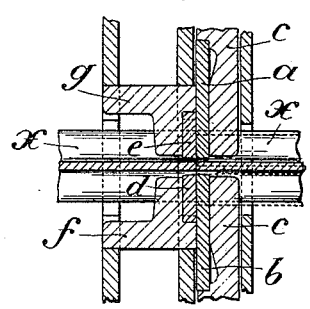
Figure 7:
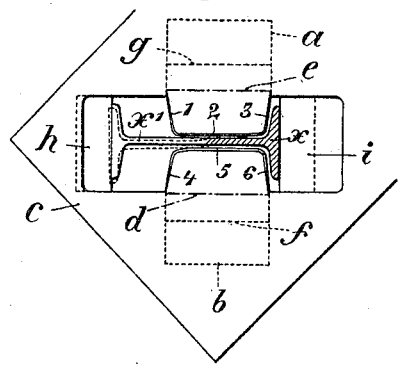
Figure 8:
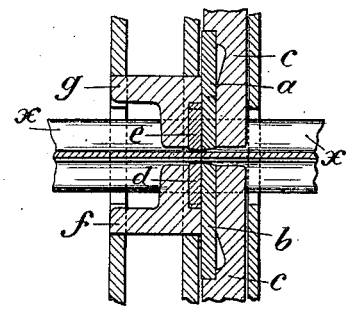
Figure 9:
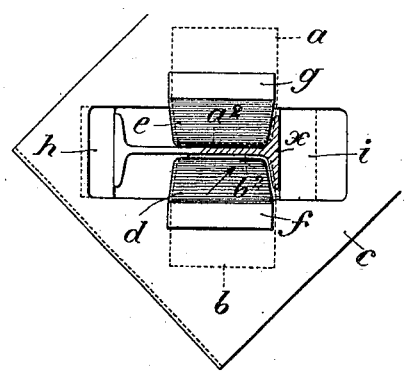
Figure 10:
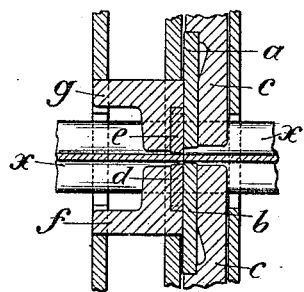
Figure 11:
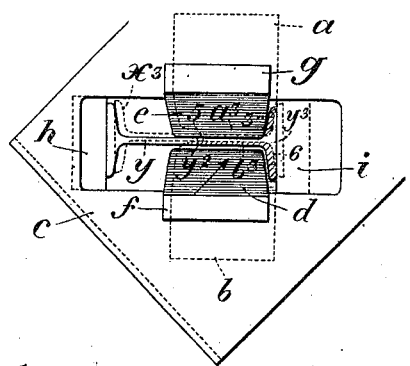
Figure 12:
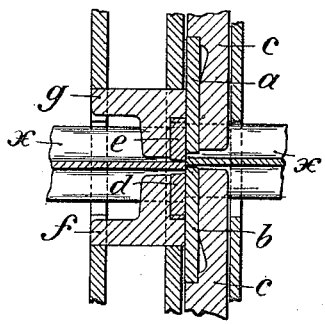

Figures 1 and 2 are corresponding elevational and sectional views showing the relation of the parts just prior to the first cutting operation; Figs. 3 and 4 are similar views illustrating the relation of the parts during the first cutting operation; Figs. 5 and 6 are similar views illustrating the relation of the parts just after the first cutting operation; Figs. 7 and 8 are similar views illustrating the relation of the parts just prior to the second cutting operation; Figs. 9 and 10 are similar views illustrating the relation of the parts during an initial stage of the second cutting operation; and Figs. 11 and 12 are similar views illustrating the relation of the parts during the last stage of the second cutting operation.

Similar characters of reference designate corresponding parts throughout the several views.

The device consists of the upper cutter $a$, and the bottom cutter $b$ which in this construction are mounted on a vertically adjustable carriage $c$ which moves obliquely, for instance, at an angle of 45°, relatively to the girder web, and of a bottom cutter $d$ and an upper cutter $e$ mounted in cutter holders $f$ and $g$. The two cutter holders are secured to the machine body, that is to say, are stationary. The device is also provided with lateral cutters $h$ and $i$ which can be moved nearer together or farther apart and can be shifted together either positively, or relatively to the cutters $a$ and $b$. The cutting edges of all the cutters $a$ $b$ $d$ $e$ $h$ $i$, are situated in one plane, and the extent to which the adjustable cutters approach the stationary ones, is kept so small that the fiber of the girder is only just broken. The cutters approach each other, it is true, but never slide past each other. Figs. 1 and 2 show the double girder $x$ mounted in the cutter group. The cutters are adjusted for the first half cut, the lateral cutters are close to the flanges of the girder.

Figs. 3 and 4 show in elevation and section the first half cut executed. The carriage $c$ has been moved downward in the direction of the arrow, the upper cutter $a$ with its cutting edge 1, in coöperation with the stationary lateral cutter $h$, has penetrated into the upper flange half, and with its cutting edge 2, in coöperation with the stationary bottom cutter $d$, into the left hand web portion, and the bottom cutter $b$ with its cutting edge 4, in coöperation with the stationary lateral cutter $h$, into the bottom left hand flange half. At the end of the downward movement of the carriage $c$, the upper cutter $a$ and the bottom cutter $b$ have assumed the dotted positions $a'$ $b'$ (Fig. 3). Owing to the penetration of the cutters into the web, and into the flanges, the girder $x$ has assumed, on its left hand half, the position $x'$, and owing to the cutting through its web $y$, it has been slightly deformed as shown by the dotted line $y'$. The cutter group $a$ $b$ return thereupon to their original or central position, that is to say, to the position shown in Fig. 1, the slight deformation $y'$ of the half cut girder web being shown in Fig. 5. The double T girder is then brought into the position required for the second cut, by a positive or relative movement of the lateral cutters $h$ and $i$ relatively to the device (Fig. 7). The girder $x$ is therefore, for instance, shifted with the two lateral cutters $h$ $i$ toward the left (positive movement) or the device has been shifted relatively to the stationary girder (relative movement). Fig. 7 shows also the position of the partly deformed girder $x'$ between the upper cutter $a$ and the bottom cutter $b$. The carriage $c$ is then moved obliquely upward (Fig. 9) in the direction of the arrow, and first removes with its bottom cutter $b$, in coöperation with the stationary upper cutter $e$, the slight deformation $y'$ of the double T girder in its web. This is effected with the cutters $a$ $b$ in the dotted position $a^2$ $b^2$. During further upward movement of the cutters $a$ $b$ into the dotted position $a^3$ $b^3$ (Fig. 11), the second cutting is completed. The bottom cutter $b$ penetrates with its cutting edge 6, in coöperation with the stationary lateral cutter $i$, into the bottom right hand flange half, and with its cutting edge 5, in coöperation with the stationary upper cutter $e$ into the right hand web portion, namely into the rest $y^2$ of the web $y$, and the upper cutter $a$, with its cutting edge 3 in coöperation with the stationary lateral cutter $i$, into the upper right hand flange half, so that also here a separation of the girder takes place. The position of the separated girder is shown by the dotted lines $x^3$ $y^3$. After the second cut has been executed, the cutter group $a$ $b$ returns to the position shown in Fig. 1.

It is immaterial whether first the left girder side or the right (as shown in the drawing) is cut, that is to say, whether the carriage is first moved downward, or first upward.

Before the introduction of the girder into the working opening, the lateral cutters are moved away from each other to such an extent that the introduction even of the end of a double T girder covered with bur, does not present any difficulties.

What I claim is:—

1. A device of the type set forth, comprising upper and lower cutters arranged in confronting relation and movable obliquely in either direction with relation to the iron to be cut and stationary upper and lower cutters also arranged in confronting relation, the stationary cutters being positioned against the side faces of the correspondingly located movable cutters, the movable cutters as respects one another being moved in the same direction.

2. A device of the type set forth, comprising a carriage movable obliquely in either direction with relation to the iron to be cut, and having an opening through which said iron projects, upper and lower cutters mounted on the carriage for movement therewith, the cutters being arranged in confronting relation and on opposite sides of the iron to be cut, stationary cutter blocks and stationary upper and lower cutters carried by the blocks and also arranged in confronting relation at opposite sides of the iron to be cut, the stationary cutters being positioned against the side faces of the correspondingly located movable cutters.

3. A device of the type set forth, comprising a carriage movable obliquely in either direction with relation to the iron to be cut, and having an opening through which said iron projects, upper and lower cutters mounted on the carriage for movement therewith, the cutters being arranged in confronting relation and on opposite sides of the iron to be cut, stationary cutter blocks, stationary upper and lower cutters carried by the blocks and also arranged in confronting relation at opposite sides of the iron to be cut, the stationary cutters being positioned against the side faces of the correspondingly located movable cutters, and lateral cutters positioned at the ends of the opening for coöperation with the side edges of the movable cutters.

In testimony whereof I have hereunto set my hand in presence of two subscribing witnesses.

HUGO JOHN.

Witnesses:
ERNST EBERHARDT,
GUSTAV LAUTZ, Jr.

Copies of this patent may be obtained for five cents each, by addressing the "Commissioner of Patents, Washington, D. C."